UNITED STATES PATENT OFFICE.

EDWARD S. HARDY, OF BUFFALO, NEW YORK, ASSIGNOR TO HIMSELF AND JOHN L. LAY, OF SAME PLACE.

IMPROVED MATERIAL FOR COVERING STEAM-BOILERS, PIPES, &c.

Specification forming part of Letters Patent No. 94,739, dated September 14, 1869.

*To all whom it may concern:*

Be it known that I, EDWARD S. HARDY, of the city of Buffalo, in the county of Erie and State of New York, have invented a certain Compound for Protecting Boilers, Pipes, &c., of which the following is a specification:

The object of my invention is the production of a new plastic non-conducting composition or cement to be applied to the surfaces of steam-boilers and steam-pipes, and other receptacles and conduits, for preventing radiation of heat, and the permeation of water, and rendering them fire-proof.

My compound consists of the mixture, with paper-pulp or other vegetable fibrous material, of powdered steatite or soap-stone, or Portland cement, asbestus, and silicate of potassa and soda, or soluble glass.

In preparing the compound I prefer to use the ingredients in about the following proportions, viz: Fifty pounds of paper-pulp or fibrous material, fifty pounds of steatite, twenty-five pounds of asbestus, and two to four quarts of silicate of potassa and soda, or soluble glass.

These ingredients are mixed with a quantity of water sufficient to form a paste or mortar of such consistency as to enable it to be plastered over the surface to be protected. It may be applied in one or more coats or layers, in the ordinary manner, according to the nature of the article and the amount of protection required.

The various compounds in use for the above purpose have been found, from experience, to be defective to a greater or less extent, some being imperfect non-conductors, others not fire-proof, some pervious to water, and others liable to crack and fall off, not possessing the requisite tenacity, while others are objectionable on account of their corrosive properties.

The gravity and thick coating required of some compounds are such as to render them objectionable for marine purposes, where economy in weight is a matter of importance.

My improved compound is light, is fire-proof, is a perfect non-conductor, is impervious to water, adheres without cracking to the article to which it is applied, and, as a whole, it is believed to possess more of the desired qualities and in a higher degree than any other composition in use.

What I claim as my invention is—

The manufacture or preparation of a compound of the ingredients, in the proportions, and for the purposes substantially as set forth.

EDWD. S. HARDY.

Witnesses:
J. HYATT,
JNO. J. BONNER.